United States Patent
Erderly et al.

(10) Patent No.: US 6,670,412 B1
(45) Date of Patent: *Dec. 30, 2003

(54) METHOD OF MELT PROCESSING AMINE CONTAINING POLYETHYLENES

(75) Inventors: Thomas Craig Erderly, Baytown, TX (US); Joel Edward Schmieg, Humble, TX (US)

(73) Assignee: ExxonMobil Chemical Patents Inc., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/994,081

(22) Filed: Dec. 19, 1997

Related U.S. Application Data

(60) Provisional application No. 60/033,617, filed on Dec. 19, 1996.

(51) Int. Cl.⁷ .............. C08J 5/10; C08K 5/41; C08L 23/08
(52) U.S. Cl. .......... 524/156; 524/99; 524/157; 524/158; 524/159
(58) Field of Search .......... 524/99, 156, 157, 524/158, 159

(56) References Cited

U.S. PATENT DOCUMENTS

| | | | |
|---|---|---|---|
| 3,299,174 A | 1/1967 | Kuhre et al. ............... 260/876 |
| 3,326,857 A | 6/1967 | Kawasumi et al. .......... 260/67 |
| 3,327,021 A | 6/1967 | Binsbergen ............... 260/878 |
| 3,349,059 A | 10/1967 | Lappin ................. 260/45.85 |
| 3,360,497 A | 12/1967 | Jones et al. ................ 260/41 |
| 3,424,649 A | 1/1969 | Nyberg et al. ............. 161/253 |
| 3,438,955 A | 4/1969 | Rombusch et al. ........ 260/93.7 |
| 3,476,698 A | 11/1969 | Osterrieth et al. ........... 260/23 |
| 3,562,356 A | 2/1971 | Nyberg et al. ............. 260/876 |
| 3,592,879 A | 7/1971 | Ott et al. .................. 260/876 |
| 3,644,278 A | 2/1972 | Klemchuk ............ 260/45.8 N |
| 3,678,134 A | 7/1972 | Middlebrook ........... 260/876 B |
| 3,720,652 A | 3/1973 | Yagi et al. ................. 260/80.7 |
| 3,773,743 A | 11/1973 | Ainsworth et al. ..... 260/94.9 F |
| 4,171,411 A | 10/1979 | Ehrenfreund ................ 521/98 |
| 4,173,612 A | 11/1979 | Kelly ..................... 264/176 R |
| 4,210,556 A | 7/1980 | Castro et al. .................. 525/6 |
| 4,307,009 A | 12/1981 | Lüders et al. ............ 260/42.14 |
| 4,337,188 A | 6/1982 | Climenhage et al. ....... 524/140 |
| 4,454,270 A | 6/1984 | Kolodchin et al. ......... 524/102 |
| 4,476,180 A | 10/1984 | Wnuk ....................... 428/220 |
| 4,479,989 A | 10/1984 | Mahal ......................... 428/35 |
| 4,525,531 A | 6/1985 | Zukosky et al. .............. 525/92 |
| 4,649,221 A | 3/1987 | Ravichandran et al. ..... 564/300 |
| 4,708,979 A | 11/1987 | Pedrazzetti et al. ......... 524/249 |
| 4,829,116 A | 5/1989 | Piesold ...................... 524/278 |
| 4,954,545 A | 9/1990 | Bailey ...................... 524/158 |
| 5,053,531 A | 10/1991 | Govindan ................... 562/114 |
| 5,057,562 A | 10/1991 | Reinert ....................... 524/87 |
| 5,187,214 A | 2/1993 | Govindan ................... 524/157 |
| 5,272,236 A | 12/1993 | Lai et al. ................. 526/348.5 |
| 5,278,272 A | 1/1994 | Lai et al. ................. 526/348.5 |
| 5,314,924 A | 5/1994 | Lee ............................. 521/79 |
| 5,360,874 A | * 11/1994 | Wolff et al. ................. 525/227 |
| 6,107,454 A | 8/2000 | Schmieg et al. ............ 528/487 |
| 6,124,428 A | 9/2000 | Schmieg et al. ............ 528/487 |

FOREIGN PATENT DOCUMENTS

| | | | |
|---|---|---|---|
| CA | 730751 | 3/1966 | ................. 524/166 |
| DE | 2823507 | 12/1979 | ................. 524/166 |
| EP | 0017038 | 10/1980 | |
| EP | 0336573 | 10/1989 | |
| EP | 0 343 863 | 11/1989 | |
| GB | 1078738 | 8/1967 | |
| GB | 1097129 | 12/1967 | |
| GB | 1104662 | 2/1968 | |
| GB | 1115456 | 5/1968 | |
| GB | 1597769 | 9/1987 | |
| JP | 60-106846 | of 0000 | ................. 524/166 |
| JP | 49-16105 | 4/1974 | ................. 524/166 |
| JP | 54-120646 | 9/1979 | |
| JP | 54-120658 | 9/1979 | |
| JP | 58-63737 | 4/1983 | ................. 524/249 |
| JP | 61-261359 | 11/1986 | ................. 524/166 |
| JP | 03-39348 | 2/1991 | .................. 524/91 |
| JP | A 59-176339 | 2/1991 | |
| JP | 05-70644 | 3/1993 | .................. 524/91 |

OTHER PUBLICATIONS

"Polyolefin Processing Aid Versus Additive Package", Plastics Engineering, Jul. 1988, pp. 43–46.
"The Encyclopedia of Polymer Science & Technology", vol. 8, John Wiley & Sons, (1968), pp. 573–575.
"Kirk–Othmer Encyclopedia of Chemical Technology", vol. 22, John Wiley & Sons, (1983), p. 352.
Patent Abstracts of Japan, vol. 014, No. 265 (C–0726), Jun. 8, 1990 & JP 02 077449A (Mitsui Petrochem In d. LTD), M ar. 16, 1990. (See Abstract).
Chemical Additives for the Plastics Industry, Properties, Applications, Toxicologies, Radian Corporation, McLean, Virginia, 1987, pp. 99–106, 343–353.

\* cited by examiner

*Primary Examiner*—James J. Seidleck
*Assistant Examiner*—U. K. Rajguru

(57) ABSTRACT

Melt processed linear polyethylenes containing an amine additive are shown to exhibit improved processability through the addition of certain surfactants. The amine compounds are generally one or more hindered amine light stabilizers (HALS), amine antistats, amine antioxidants or amine based UV inhibitors. Among the melt processing parameters improved are reduced head pressure, reduced torque, reduced motor load, reduced or eliminated melt fracture, or combinations of these parameters. The surfactants can be chosen from a non-aromatic sulfonate or sulfate salt wherein a cation of the salt is selected from the group consisting of Na, K, Li, and other alkali cations and a quaternary ammonium cations, said surfactant being essentially free of halogens.

19 Claims, No Drawings

METHOD OF MELT PROCESSING AMINE CONTAINING POLYETHYLENES

This is a Regular Application of Provisional Application No. 60/033,617 filed Dec. 19, 1996.

BACKGROUND

Linear polyolefins, in particular, linear polyethylenes, may be difficult to melt process. Specifically, due to a low shear sensitivity when compared to highly branched polyethylenes, the linear polyethylenes can require more extruder power to pump an equivalent amount of polymer melt. As a result, higher extruder head pressures, higher torque, greater motor loads, and the like can develop, as compared to the highly branched materials.

Increases such as higher motor load, head pressure and/or torque can place undesirable, unacceptable, or unattainable requirements on specific machinery. As for instance, a specific extruder having a specific motor power and gearing, will reach a maximum of motor load, or head pressure, under certain melt temperature conditions for a given polymer being processed. If a polymer is introduced to such an extruder which has such a higher requirement for power, such as a polymer having higher molecular weight and/or narrower molecular weight distribution and/or lower shear sensitivity, the extruder will reach a maximum of one or several of these parameters, and be therefore limited in its ability to pump/perform at a similar level to the performance expected/demonstrated with a highly branched or broader molecular weight distribution polymer such as traditional high pressure low density polyethylenes. In the alternative, if melt processing machinery is to be used for certain production/extrusion, and it is not so limited, the prospect of using more power or increasing head pressure for a more difficult to extrude material, while achievable, the user of the machinery would prefer to conserve power.

Additionally, linear polyethylenes may exhibit other imperfections during extrusion, specifically blown film extrusion, that may be undesirable, such as melt fracture. These imperfections are undesirable from a quality standpoint. For instance, melt fracture, also known as "shark skin" or "orange peel", can lead to poorer optical properties and/or diminished film physical properties, that are generally unacceptable.

The introduction of linear Ziegler-Natta catalyzed polyethylenes in the late '70s and early '80s and extruder owners attempts to use these polyethylenes in machines that had been previously used to extrude free radical initiated, highly branched, high pressure produced low density polyethylenes provided the early manifestations of these problems. The advent of metallocene catalyzed linear polyethylenes in the '90s, has continued the trend towards polymers that when fabricated into films for instance, offer better physical properties and/or manufacturing economics, but have higher power requirements and/or greater tendency to exhibit melt fracture in the blown film process.

Linear polyethylenes therefore have been the subject of a good deal of effort to eliminate or, reduce such problems. Some of the attempts included regearing extruders, designing new and more efficient screws and dies, increasing the power train, addition of expensive fluoroelastomeric processing aids and the like. In nearly every instance, the cost involved has not been inconsequential, as well as the inconvenience. But such costs have been born, due to the desirability of physical properties and/or downgaging possible with the linear polyethylenes.

Additionally, a widely used aid to improve processability and eliminate melt fracture in linear polyethylenes, fluoroelastomers, are relatively expensive. In addition to their expense, they have a drawback in that even if their cost were acceptable, they appear to be rendered ineffective to reduce melt fracture in the presence of certain amine compounds. Specifically, in many linear polyethylene uses such as heavy duty bags for gardening materials such as mulch and potting soil, the manufacturers of such bags will include hindered amine light stabilizers (HALS) in the bag formulation to assist in mitigating the polyethylene's degradation due to ultraviolet light. For many years it has been recognized that inclusion of HALS to a polyethylene formulation generally substantially negates the usual positive processing benefit of the fluoroelastomers when the elastomers are intended to reduce melt fracture.

Application "Polyolefin Processing Aid Versus Additive Package" Plastics Engineering, July 1988, pp 43–46, suggests that with Fluorocarbon elastomers that are known for increasing processability of and eliminating melt fracture from polyolefin resins, interactions among additives are sometimes detrimental to the effect of the fluorocarbon.

Specifically, among the interactions were those reported between amine compounds, specifically hindered amine light stabilizers (HALS) and the fluorocarbon elastomers. The interactions were reported to increase viscosity and exhibit shark skin.

GB 1,104,662 suggests addition of the salt of alkyl benzene sulfonic acids to polyolefins that purportedly gives a beneficial effect on melt extrusion behavior of the polyolefin. The purported effect is the reduction of the occurrence of "shark skin" or "orange peel". Both alkali and alkaline earth metal salts of alkyl benzene sulfonic acids are purported to be effective. The document is devoid of any identification of the polyethylene, such as molecular weight distribution (MWD), or composition distribution breadth index (CDBI).

GB 1,078,738 suggests that addition of an "external lubricant" to high molecular weight polyolefins can, purportedly, reduce occurrence of melt fracture. Suggested as external lubricants are salts of monovalent to tetravalent metals, and saturated or unsaturated carboxylic acids containing 10 to 50 carbon atoms. Sulfonates corresponding to the fatty acid salts are also said to be suitable. However, stearates, palmitates and oleates are exemplified. This document indicates an equivalence of metal salts of mono to tetra-valent metals.

JP A 59-176339 suggests that when polyolefins are narrowed in MWD or given higher molecular weight, poor fluidity results which in turn gives rise to melt fracture. The solution suggested is addition of fluorinated compounds including potassium salts of fluoroalkylsulfonic acids. These potassium salts are said to exhibit preferable temperature dependence when compared to other cations such as sodium, calcium, lithium and ammoniumn. The polyolefin/salt combination is said to be effective at 230° C. or higher.

In addition to the limitations noted above, none of these documents suggests a solution to the problem of difficult processing of linear polyethylene in the presence of amines.

There is a need therefore for a relatively inexpensive, easily implemented solution to the processing problems outlined above. Such a solution should also include a material that when included in blown film extrusion of linear polyethylenes in the presence of HALS, will readily melt or incorporate into the melted polyethylene, and not adversely affect physical properties, not be extractable, or negatively impact organoleptics of the film. Specifically, there is a commercial need for a material that may be easily incorporated into linear polyethylenes, that will reduce or eliminate the increased power requirement (e.g. motor load and or torque), increased head pressure, and melt fracture, especially in the presence of HALS or other amine compounds.

SUMMARY

The present invention is directed to such a material, a certain group of surfactants, and methods of their use which when incorporated into a linear polyethylene containing HALS, can reduce or eliminate processing problems such as melt fracture, increased motor load, increased torque, and combinations thereof and may thereby increase potential production rates.

In certain embodiments of the present invention a method of processing polyethylenes comprising selecting a linear polyethylene, from a group such as linear low density polyethylene (LLDPE), metallocene LLDPE (m-LLDPE), high density polyethylene (HDPE), plastomers, ultra high molecular weight high density polyethylene (UHMW-HDPE), medium density polyethylenes (MDPE), or combinations thereof, adding an amine light stabilizer such as HALS, adding a surfactant having a melting point that does not exceed the processing temperature of the polyethylene by more than approximately 30° C. The surfactant being a non-aromatic sulfonate or sulfate salt having a cation of either an alkali metal or a quaternary ammonium, that is essentially free of halogens. An amount of the surfactant should be added that will be sufficient to improve the melt processability of the polyethylene or polyethylene/elastomer blend. The combination of linear polyethylenes, HALS, and surfactant or surfactants is then used to melt process the combination into a useful article, such as a film, blow molded part, and the like, in the substantial absence of melt fracture.

The polyethylenes may be conventional Ziegler-Natta (Z-N) catalyzed materials that generally have a molecular weight distribution characterized by the ratio of weight average molecular weight to the number average molecular weight ($M_w/M_n$) above about 4, or the polyethylenes may be metallocene catalyzed, and will then have an approximate $M_w/M_n$ of less than 3, preferably less than 2.5, and a z-average molecular weight ($M_z$) divided by $M_w$ ($M_z/M_w$) not exceeding 2.

Also contemplated are compositions of a polyethylene having an Mw/Mn less than 3, and an alkali metal alkyl sulfonate or sulfate wherein the alkyl group has 6–30 carbon atoms, where the surfactant is present in the polyolefin in a range of from 0.005 to 5 weight percent based on the total weight of the polyethylene. The surfactant should ideally be substantially non-extractable from the final fabricated article.

These and other features, aspects, and advantages of the present invention will become better understood with reference to the following description and appended claims.

DESCRIPTION

In certain embodiments of the present invention, methods of and compositions for reducing or eliminating; a) melt fracture; b) increased torque; c) increased head pressure; d) increased motor load, e) combinations thereof, and the like, during the melt processing of polyethylenes, and other polyolefins are contemplated. These embodiments include both conventional Z-N and metallocene catalyzed polyethylenes(the latter hereinafter "m-polyethylenes) when combined with HALS, and their combination with certain surfactants that when so combined achieve the stated melt processing improvements. The combination of linear polyethylenes, HALS, and surfactants are particularly well suited to melt processing and fabrication into films, blow molded articles, and the like, while reducing or eliminating one or more of the processability problems discussed above and generally without being extractable from the final fabricated article.

Following is a detailed description of certain preferred combinations of polyethylenes and surfactants and methods of using the combinations in melt processing into useful articles. Those skilled in the art will appreciate that numerous modifications to these preferred embodiments can be made without departing from the scope of the invention. For example: Although methods of improving melt processing of m-polyethylenes containing HALS into films are exemplified, they will have numerous other uses and the films may be formed from other polyolefins or combinations of polyethylenes. To the extent this description is specific, it is solely for the purpose of illustrating preferred embodiments of the invention and should not be taken as limiting the present invention to these specific embodiments.

Definitions

Torque: horse power/rpm
Motor Load: amps
Head Pressure: psi
Melt Fracture:

The Encyclopedia of Polymer Science and Technology, Vol. 8, John Wiley & Sons, (1968) pp. 573–575 indicates that for a given polymer, processed at a constant melt temperature, there exists a critical shear rate in the melt fabrication process. Melt processing of the polymer below this critical shear rate will result in a smooth extrudate surface while processing the polymer above it will result in a rough extrudate surface. The observed roughness is commonly referred to as "melt fracture" but may also be described by other terms such as "sharkskin" or "orange peel". For a given polymer, the critical shear rate increases as the melt processing temperature of the polymer increases.

The extent of extrudate roughness will vary depending upon the shear rate at which the polymer is processed. At shear rates just above the critical value, the extrudate roughness normally results in a loss of surface gloss and is typically called "sharkskin". At higher shear rates, the extrudate exhibits periodic areas of roughness followed by areas of smoothness in a more or less regular pattern. This phenomenon is normally described as "cyclic melt fracture". At very high shear rates, the extrudate may become grossly distorted resulting in a what is commonly called "continuous melt fracture".

In general, linear polyethylenes, particularly those with high average molecular weights and/or narrow molecular weight distributions, tend to be more prone to the formation of melt fracture than highly branched polyethylenes.

The presence of melt fracture in a fabricated article can lead to poorer optical properties and is generally aesthetically unacceptable. Attempts to eliminate melt fracture in articles fabricated from linear polyethylenes by either reducing the processing shear rate (reduced production rate) or by increasing the processing temperature (increased melt temperature) are generally not commercially viable. In addition, changes in die design to reduce the shear rate (e.g., use of wider die gaps) can result in other problems such as excessive orientation leading to unbalanced article properties. Although fluoroelastomeric processing additives have been used to eliminate sharkskin or melt fracture in linear polyethylenes under certain processing conditions, their use is expensive due to the high cost of the fluoroelastomer and their effectiveness is substantially negated in the presence of HALS compounds.

By substantial elimination of melt fracture we intend that either the shark skin or the cyclic melt fracture is substantially eliminated providing a smooth surface to the fabricated article.

Polyethylenes

The polyethylenes contemplated in certain embodiments of the present invention, include ethylene alpha-olefin copolymers and ethylene homopolymers. By copolymers we intend combinations of ethylene and one or more alpha-olefins. In general the alpha-olefin comonomers can be selected from those having 3 to 20 carbon atoms. Specifically the combinations may include ethylene-propylene; ethylene 1-butene; ethylene 1-pentene; ethylene 4-methyl-1-pentene; ethylene 1-hexene; ethylene 1-octene; ethylene decene; ethylene dodecene; ethylene, propylene, 1-butene; ethylene, 1-butene, 1-hexene; ethylene, 1-butene, 1-pentene; ethylene, 1-butene, 4-methyl-1-pentene; ethylene, 1-butene, 1-octene; ethylene propylene 1-butene 1-hexene; ethylene, 1-hexene, 1-pentene; ethylene, 1-hexene, 4-methyl-1-pentene; ethylene, 1-hexene, 1-octene; ethylene, 1-hexene, decene; ethylene, 1-hexene, dodecene; ethylene, propylene, 1-octene; ethylene, 1-octene, 1-butene; ethylene, 1-octene, 1-pentene; ethylene, 1-octene, 4-methyl-1-pentene; ethylene, 1-octene, 1-hexene; ethylene, 1-octene, decene; ethylene, 1-octene, dodecene; and the like permutations, The comonomer or comonomers will be present in the copolymers in the range of from about 0.1 to about 40 mole percent. The actual amount of comonomers will generally define the density range.

Density ranges contemplated to be useful include 0.86–0.97 g/cc and all portions and constituents of the range. Specifically included are the 0.86–0.915 g/cc (plastomers) 0.916–0.925. (LLDPE), 0.926–0.940 (MDPE), and 0.941–0.970 (HDPE). Melt indices contemplated include 0.001–50, preferably 0.5 to 5.0 for blown films, and 0.3–10 for blow molding, and all members of these ranges (melt index in dg/min or g/10 minutes).

Polyethylenes that are produced using metallocene catalysts include ionizing activators as well as alumoxanes.

Included in the embodiments contemplated are those where either m-polyethylenes and Z-N polyethylenes may be blended with each other and/or with other components such as LDPE, (highly branched, high pressure free radical polymerized) and other ethylene copolymers such as ethylene vinyl acetate (EVA), ethylene n-butyl acrylate (EnBA), ethylene methyl acrylate (EMA), ethylene ethyl acrylate (EEA), ethylene acrylic acid (EAA), ethylene methacrylic acid (EMAA), and ionomers of the acids, terpolymers such as ethylene, vinyl acetate methyl acrylate; ethylene, methyl acylate, acrylic acid; ethylene, ethyl acrylate, acrylic acid; ethylene, methyl acrylate, methacrylic acid; ethylene, methylacrylate, methacrylic acid; and the like. Additional blend components include styrenic block copolymers such as styrene, butadiene, styrene; styrene, isoprene, styrene; styrene ethylene butadiene styrene; ethylene propylene rubber, ethylene propylene diene monomer rubber and the like. Such blends are disclosed in copending application U.S. Ser. No. 08/692,694 incorporated herein by reference for purposes of U.S. patent practice.

Also Contemplated are multi-layer blown film extrusions where one or more of the layers can include a polyethylene/surfactant combination. Such extrusion may include a linear polyethylene layer, a heat seal layer, a barrier (gas and/or vapor) layer, recycle or regrind layer or combinations thereof.

Some of these blend components may affect processing variables in a positive manner, in which case the invention contemplated will include some portion of the below discussed surfactants, possibly less than with an unblended material.

Most polyethylenes will contain various additives well known to those of ordinary skill in the art, including, but not limited to slip, anti-block, anti-oxidants, anti-fogs, acid neutralizers, UV inhibitors, anti-static agents, pigments, dyes, release agents, fungicidal, algecidal, bactericidal, and the like.

As used in this application, the processing temperature of polyethylene in the blown film process will generally be in the range of 300–450° F. (149–232° C.), preferably 350–410° C. (177–210° C.), a point generally above the melting point of the polyethylene and below its degradation or decomposition temperature. This is generally the temperature of the melt exiting the die, but may be measured at any point downstream of the screw elements. The processing temperature will be understood by those of ordinary skill to vary generally by the melt fabrication technique, and within a fabrication technique, processing temperature can vary by the type of processing equipment, or by specific requirements of a particular manufacturer.

Amines

Hindered Amine Light Stabilizers

Hindered Amine Light Stabilizers (HALS) and/or Hindered Amine Stabilizers (HAS). These additives may be used as light or UV stabilizers/inhibitors or as thermal stabilizers providing Long Term Thermal Stability (LTTS) or Long Term Heat Aging (LTHA). Generally these additives contain a sterically hindered piperidine structure as shown below:

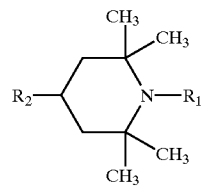

where $R_1$ is one of hydrogen, hydroxyl, straight chain or branched alkyl of 1 to 18 carbons, straight chain or branched alkoxy of 1 to 18 carbons, aryl, arylalkyl of 7 to 18 carbons, cycloalkyl of 5 to 18 carbons, cycloalkoxy of 5 to 18 carbons. The alkyl, alkoxy, aryl, arylalkyl, cycloalkyl or cycloalkoxy groups may optionally contain one or more hydroxyl groups, $R_2$ is one of aliphatic amine, aliphatic diamine, aromatic amine, straight chain or branched alkyl of 1 to 18 carbons, aliphatic ester, cycloalkyl of 5 to 18 carbons. The aliphatic amine, aliphatic diamine, aromatic amine, alkyl, aliphatic ester or cycloalkyl group is optionally bound to an aliphatic carbon or silicone based chain which may optionally contain one or more triazine groups. The aliphatic carbon or silicone based chain may optionally be polymerizable.

The most common is a 2,2,6,6-tetramethyl-4-piperidyl group which is chemically bound to an amine group that is part of a carbon or silicone based backbone which may be polymerizable. Monomeric and oligomeric forms of these additives are available. Examples include, but are not limited to:

Bis(2,2,6,6-tetramethyl-4-piperidyl)sebacate (CAS RN 52829-07-9), Dimethyl succinate polymer with 4-hydroxy-2,2,6,6-tetramethyl-1-piperidineethanol (CAS RN 65447-77-0), Poly[(6-morpholino-s-triazine-2,4-diyl) (2,2,6,6-tetramethyl-4-piperidyl)imino]-hexamethylene[2,2,6,6-tetramethyl-4-piperidyl) imino]] (CAS RN: 82451-48-7), Poly[(6-[1,1,3,3-tetramethylbutyl)amino]-s-triazine-2,4-diyl][2,2,6,6-tetramethyl4-piperidyl)imino]]hexamethylene[2,2,6,6-tetramethyl-4-piperidyl)imino]] (CAS RN: 70624-18-9), 2,2,6,6-Tetramethylpiperidin4-yl acrylate/methyl methacrylate copolymer (CAS RN 115340-81-3), 1,3, 5-Triazine-2,4,6-triamine,N,N'''-[1,2-ethanediylbis[[[4, 6-bis[butyl(1,2,2,6,6-pentamethyl4-piperidinyl) amino]-1,3,5-triazine-2-yl]imino]-3,1propanediyl]]-bis [N',N''-dibutyl-N',N''-bis(1,2,2,6,6-pentamethyl-4-piperidinyl)-(CAS RN 106990-43-6) Polymer of 2,2, 4,4 tetramethyl-7-oxa-3,20diaza-dispiro[5.1.11.2]-heneicosane-21-on.

Other Amine Additives

The optional use of amines in polyethylene, in addition to or in place of HALS, may also include, but is not limited to, various amine based antistatic agents, antioxidants, stabilizers, as well as other UV or light stabilizers: Ethoxylated alkyl amines such as $RN(CH_2CH_2OH)_2$, where the carbon number of the alkyl group (R) varies from 8 to 20. The alkyl group may be saturated or unsaturated and may be derived from a number of sources (cocoa, tallow, vegetable, or synthetic). Examples include, but are not limited to:

N,N Bis-(2 hydroxy ethyl) tallow amine (CAS RN 61791-44-4), N,N Bis-(2 hydroxy ethyl) stearyl amine (CAS RN 10213-78-2), N,N Bis-(2 hydroxy ethyl) cocoa amine (CAS RN 61791-31-9), N,N Bis-(2 hydroxy ethyl) oleyl amine (CAS RN 25307-17-9).

Dialkyl hydroxylamines ($R_2NOH$) where the carbon number of the alkyl group varies from 8 to 24. The alkyl group may be saturated or unsaturated, branched or straight chain. The alkyl groups may optionally contain one or more hydroxyl groups. Distearyl hydroxylamines dilauryl hydroxylamine are examples.

Mono-, di-, or tri- alkyl or aryl or arylalkyl amines, where the carbon number of the alkyl group varies from 2 to 30. The alkyl group may be saturated or unsaturated, branched or straight chain. The aryl group may be substituted with one or more alkyl groups. 4,4'-Bis (α, α-dimethylbenzyl) diphenylamine is an example.

Amine based nickel/sulfur complexes used as UV or light stabilizers. Examples include, but are not limited to:

2,2'-Thiobis(4-tert-octylphenolato)]-n-butylamine nickel, Nickel dibutyldithiocarbamate (CAS RN 13927-77-0), Thiobis-2,2'-(4(1,1,3,3-tetra-methylbutyl)-phenol)-Nickel-2-ethyl-hexanoate (CAS RN 38727-83-2, 7580-31-6).

Surfactants

The surfactants contemplated include non-aromatic sulfate or sulfonate salts where the cation is one of an alkali metal, e.g. Li, Na, K, and other alkali cations, or a quaternary ammonium salt. Sodium salts being preferred. The surfactants may also be described as alkali metal alkyl sulfates or sulfonates where the alkyl group is a C6 to C30 alkyl group, preferably C8to C20, more preferably C12 to C18. The alkyl group may be chosen from the group consisting of branched or straight chain saturated alkyls, branched or straight chain unsaturated alkyls, branched or straight chain alkoxy alkyls, where the alkyl group optionally contains 1 or more hydroxyl groups. Minor amounts of aromatic sulfates or sulfonates may, also be included. By minor amounts we intend that this be less than about 20% by weight of the total surfactant, preferably less than about 15% by weight, more preferably less than about 10% by weight.

One class of surfactants that are preferred in this application are α-olefin sulfonates. As stated in the Kirk-Othmer Encyclopedia of Chemical Technology, Vol. 22, John Wiley & Sons, (1983) pg. 352, α-olefin sulfonates are produced by reaction of α-olefin with SO3 in air followed by neutralization with a base to produce the corresponding salt. The sodium salts are the most preferred. Commercial α-olefin sulfonates are a mixture of alkene sulfonates and hydroxy alkane sulfonates. The position of the double bond in alkene sulfonates as well as the hydroxyl group in hydroxy alkane sulfonates varies along the carbon chain of the alkyl group.

More detailed description of the surfactants follows.

The surfactant includes those, of the general formulae:

$$[R_1SO_x]M_1 \qquad \text{I.)}$$

where x=3 or 4

$M_1$ is selected from the group consisting of
Li, Na, K, and other alkali cations, and $M_1$ optionally includes $NH_4^+$ or quaternary ammonium salts of the structure:

$R_1$, $R_2$, $R_3$, $R_4$ are selected from the group consisting of:
branched or straight chain saturated alkyl,
branched or straight chain unsaturated alkyl,
branched or straight chain alkoxy, wherein said $R_1$, $R_2$, $R_3$ and $R_4$ are essentially free of halogens; and wherein said $R_1$, $R_2$, $R_3$ and $R_4$ may contain hydroxyl groups; and wherein the carbon number of said $R_1$, ranges from 6 to 30; and wherein the carbon number of said $R_2$, $R_3$, $R_4$ ranges from 2 to 8;

wherein said surfactant is present in said combination in a range of 0.005 to 5.0 weight percent, preferably 0.01 to 0.5, more preferably 0.03 to 0.35 weight percent based on the total weight of the combination.

or a surfactant represented by one of the formulae:

$$[R_1SO_x]M_1 \qquad \text{II.)}$$

where x=3 or 4

$M_1$ is selected from the group consisting of:
Li, Na, K, and other cations. $M_1$ optionally includes $NH_4^+$ or quaternary ammonium salts of the structure,

$R_1$, $R_2$, $R_3$, $R_4$ are selected from the group consisting of
branched or straight chain alkyl,
branched or straight chain unsaturated alkyl,
branched or straight chain alkoxy,
wherein said $R_1$, $R_2$, $R_3$ and $R_4$ may contain hydroxyl groups; and wherein the carbon number of said $R_1$ ranges from 6 to 30; and wherein the carbon number of said $R_2$, $R_3$, and $R_4$ ranges from 2 to 8.

wherein said surfactant is present in said combination in a range of 0.005 to 5.0 weight percent, preferably 0.01 to 0.5, more preferably 0.03 to 0.35 weight percent based on the total weight of the combination.

The surfactant or surfactants should be substantially free of halogens. By substantially free of halogens we intend that the surfactant molecules will have preferably no halogen.

The surfactants may be present in the polyethylene combination in the range of from 0.005–5.0 weight percent, preferably 0.01–0.5, more preferably 0.03–0.35 weight percent (including all elements in these ranges) based on the total weight of the combination. The amount and type of surfactant present will determine the effect on the melt processing characteristics, for instance as shown below, smaller amounts at about 0.35 wt % or below preferably 0.25%, more preferably 0.10 wt %, or below, will primarily function to reduce melt fracture, while amounts above that level, up to the indicated higher levels will begin to also reduce head pressures, torque, motor load or combinations thereof While greater amounts than the 0.5 levels may be used, adverse extrusion effects may result, such as screw slippage.

Those of ordinary skill will appreciate that at higher levels, generally above 0.1 weight percent, the surfactant or a combination of surfactants will be effective in reducing not only melt fracture, but motor load, torque, head pressure and the like by at least 5% for one or more of these variables. Generally at lower levels than 0.1 weight percent the reductions of these motor load, torque and head pressure parameters will be less, but the surfactants will be effective in reducing melt fracture.

The mechanism of melt fracture reduction is believed to involve the formation of a layer of surfactant on the internal metal surfaces of key components of the melt processing equipment. This layer effectively increases the velocity of molten polymer at the metal interface thereby minimizing the polymer flow distortions that occur as the molten polymer exits the melt processing equipment which typically results in melt fracture. The use of a relatively high concentration of surfactant, e.g. 0.5 weight percent, will generally result in a faster rate of metal surface coating and, therefore, a more rapid rate of reduction in melt fracture of the final fabricated article. At lower surfactant levels, the metal surface coating rate, and the corresponding melt fracture reduction rate, will be slower.

It should be noted that when discussing the weight percent of surfactant, we intend that this be based on the total weight of the surfactant and HALS or other amine additive or additives, polyethylene (or polyethylene blend). If other constituents are included the amount of surfactant should be then calculated on a parts per hundred parts of polyethylene basis. Likewise if a blend constituent (with the linear m-polyethylene) assists in improving processability, then the contemplated amount of surfactant will be that level sufficient to achieve the intended effect, e.g. reduction of one or more of melt fracture, motor load, torque, or head pressure.

For example, blends of one or more of the above surfactants may be used to achieve the desired results, as well as combinations of polyolefin waxes and/or fluoroelastomers with one or more surfactants. For instance one or more of the surfactants listed above may be combined with a polyethylene wax in ratios from 10–90 and 90–10 and all elements in and between these ranges, and a similar combination with fluoroelastomers is also contemplated, as well as surfactant/polyethylene wax/fluoro-elastomer combinations.

Film Properties

Other final product variables or parameters that are included are discussed below.

The addition of sufficient levels of surfactant to a polyethylene should generally be "property neutral" that is, the surfactant addition should not substantially diminish any important finished product property such as haze, impact resistance, gloss, tear resistance, modulus, and the like.

The surfactant should have a melting point not generally greater than 30° C., preferably 25° C., more preferably 20° C., most preferably 15° C. above the processing temperature of the linear polyethylene. The surfactant is generally and preferably molten at the processing temperature of the polyethylene. The processing temperature will be well understood by those of ordinary skill in the art and will differ by melt fabrication technique, e.g. blown film and blow molding temperatures will vary. Also melt processing temperature can be characterized by the melt temperature itself rather than the extruder zone temperatures.

Extractability

Extractability of the surfactant from the polyethylene-surfactant matrix should be no more than 7% (wt) of the total surfactant in either water (at 100° C. for 3 hrs.) or 95%/5% ethanol/water (at 55° C. for 4 hrs.), preferably not more than 5% (wt.), more preferably not more than 4% (wt.), all based on not more than 3 wt. % of surfactant in the polyethylene.

EXAMPLES

Exceed™ ECD102 of the following nominal properties 1 melt index, 0.917 gm/cc density, ethylene 1-hexene copolymer available from Exxon Chemical Co., Houston, Tex., USA), is used in this example. ECD 102 granular mLLDPE resin was split into three portions. The first portion (Baseline 1) was pelletized after addition of the antioxidants and contained no added processing aid. A control sample was prepared by adding 0.08 wt % Dynamar™ FX-9613 (a fluoroelastomeric processing aid available from 3M Co., St. Paul, Minn., USA) to the second portion of the granular resin (Comparative Example C1). The third portion of the granular mLLDPE resin (Example 1) was formulated by adding 0.25 wt % BioTerge® AS-90B Beads (a sodium $C_{14}$–$C_{16}$ alpha olefin sulfonate available from Stepan Co., Northfield, Ill., USA). All three portions were compounded and pelletized on a Werner Pfleiderer ZSK30 mm twin screw extruder. To each of the three pelletized formulations was added 0.2 wt % Tinuvin 622 HALS by physically blending a PE based pelletized masterbatch which contained 10 wt % of the HALS additive. Tinuvin 622 is a dimethyl succinate polymer with 2,2,6,6-tetramethyl-1-piperridineethanol.

The pelletized formulations were extruded into film on a 2.5 inch (10 cm) Egan blown film extruder. The extruder has a 24/1 length/diameter ratio Sterlex general purpose barrier screw and is equipped with a 6 inch diameter annular die with a 0.030 inch die gap. The temperature profile used ranged from 300 to 400° F. (149–204° C.). Observed melt temperatures varied from 426 to 434° F. (219–223°). Extruder screw rpm was set to 90, resulting in! an output which ranged from 163 to 173 Ib/lhr (74–79 kg/hr). Under these conditions, the estimated shear rate averaged approximately 600 $sec^{-1}$. The extruded film gauge was nominally 0.0015 (38 microns) inch with a layflat of approximately 24 inches (61 cm).

The extrusion sequence for each test formulation was as follows. The film line was purged with al process aid-free LDPE masterbatch containing approximately 4 wt % diatomaceous earth antiblock (A1) to remove any previous polymer or process aid from the extruder and die. Next, the Baseline 1 MLLDPE resin formulation was extruded into film for 60 minutes to establish baseline conditions. Samples of the film were inspected to ensure complete melt fracture. Under these extrusion conditions, the Baseline 1 films exhibited periodic regions of clear and sharkskin melt fracture across all of the machine direction (MD) lanes of the film. This periodic behavior is characteristic of cyclic melt fracture. Finally, the process aid containing test formulation (Comparative Example C1 or Example 1) was extruded into film for a period of up to 90 minutes. Periodic samples of the film were taken and the percentage of residual melt fracture, in the transverse direction of the film, was measured visually. During this time, measurements of melt temperature, extruder head and die pressure, motor load, etc. were also recorded. Table #1 summarizes the run data for Baseline 1 (Run #1) and the Comparative Example C1 while Table #2 shows the data for Baseline 1 (Run #2) and Example 1.

As can be seen by the data in Table #1, the addition of 0.08% Dynamar FX-9613 did not reduce the level of melt fracture observed in the Comparative Example C1 films despite extruding this formulation for up to 90 minutes. The C1 film samples showed cyclic melt fracture across all of the machine direction (MD) lanes of the film throughout the entire extrusion run. Extruder head and die pressures decreased approximately 8.8% and 4.9% relative to the Baseline 1 formulation. The motor load actually increased 3.5% during the run.

By contrast, as shown in table 2, the presence of 0.25 wt% BioTerge® AS-90B completely eliminated all of the melt fracture in the HALS containing Example 1 films after 20 minutes of elapsed extrusion time (See Table 2). Melt fracture-free film was maintained for the duration of the run (up to 60 minutes). Extruder head and die pressures decreased approximately 5.6% and 6.4% relative to the Baseline 1 formulation. The motor load dropped slightly over this time period (2.9%). One of the greatest observed changes was in the melt temperature which dropped approximately 11° F. vs a drop of only 1° F. for the Comparative Example C1 run.

The significance of these results are apparent when they are compared to the performance of these same two processing aids in a HALS-free Exceed™ ECD102 matrix. Separate HALS-free Exceed™ ECD102 formulations containing 0.08% Dynamar FX-9613 and 0.25 wt % BioTerge® AS-90B were extruded under the same test conditions and both formulations were able to completely eliminate melt fracture within 12.5 minutes of elapsed extrusion time (see tables 3 and 4). Clearly the presence of the HALS has significantly reduced the ability of the Dynamar FX-9613 PPA to reduce or eliminate melt fracture in Exceed™ ECD102 films.

These test results (1) confirm that addition of a typical HALS additive to a mLLDPE formulation containing a fluoroelastomeric processing aid substantially interferes with the ability of the processing aid to eliminate melt fracture and (2) demonstrate that addition of the same HALS additive to a mLLDPE containing sodium α-olefin sulfonate surfactant unexpectedly and surprisingly does not prevent the surfactant from eliminating melt fracture in the blown film. It is also surmized that this would also be the case with Ziegler-Natta catalyzed polyethylenes.

TABLE 1

Blown Film Extrusion of Baseline 1 (Run #1) Followed by Comparative Example #1 with 0.08% Dynamar FX-9613 PPA

| Extruded Sample | | Processing Aid | | 2.5 in. Egan Blown Film Extrusion Conditions | | | | | | |
|---|---|---|---|---|---|---|---|---|---|---|
| Example # | Elapsed Extrusion Time (min) | Bioterge AS-90B Conc (wt %) | Dynamar FX-9613 Conc (wt %) | Head Pressure (psig) | Die Pressure (psig) | Motor Load (amps) | Melt Temp (deg F.) | Extruder Output (lb/hr) | Specific Extruder Output (lb/hr/rpm) | Melt Fracture (1) (%) |
| Baseline 1 (Run #1) | 60 | 0 | 0 | 5580 | 4670 | 51.2 | 435 | 163 | 1.81 | 100 |
| C1 | 2 | 0 | 0.08 | 5350 | 4620 | 51.2 | 435 | — | — | 100 |
| C1 | 10 | 0 | 0.08 | 5270 | 4580 | 51.4 | 435 | — | — | 100 |
| C1 | 12.5 | 0 | 0.08 | 5180 | 4560 | 51.8 | 434 | — | — | 100 |
| C1 | 15 | 0 | 0.08 | 5330 | 4570 | 52.6 | 435 | — | — | 100 |
| C1 | 20 | 0 | 0.08 | 5290 | 4570 | 53.0 | 436 | — | — | 100 |
| C1 | 30 | 0 | 0.08 | 5220 | 4480 | 52.0 | 436 | 170.6 | 1.90 | 100 |
| C1 | 60 | 0 | 0.08 | 5090 | 4440 | 53.0 | 434 | 169.5 | 1.88 | 100 |
| C1 | 90 | 0 | 0.08 | 5140 | 4440 | 51.9 | 434 | — | — | 100 |
| % Change for #C1 at 60 minutes vs Baseline 1 | — | — | — | −8.8% | −4.9% | +3.5% | −1 deg F. | +4.7% | +4.7% | 0% |

(1) All C1 film samples show cyclic melt fracture across all MD lanes.

TABLE 2

Blown Film Extrusion of Baseline 1 (Run #2) Followed by
Example #1 with 0.25% Bioterge AS90B Surfactant

| | Extruded Sample | Processing Aid | | 2.5 in. Egan Blown Film Extrusion Conditions | | | | | | |
|---|---|---|---|---|---|---|---|---|---|---|
| Example # | Elapsed Extrusion Time (min) | Bioterge AS-90B Conc (wt %) | Dynamar FX-9613 Conc (wt %) | Head Pressure (psig) | Die Pressure (psig) | Motor Load (amps) | Melt Temp (deg F.) | Extruder Output (lb/hr) | Specific Extruder Output (lb/hr/rpm) | Melt Fracture (%) |
| Baseline 1 (Run #2) | 60 | 0 | 0 | 5560 | 4680 | 52.0 | 436 | 166.3 | 1.85 | 100 |
| 1 | 2 | 0.25 | 0 | 5480 | 4500 | 50.2 | 435 | — | — | 30.1 |
| 1 | 10 | 0.25 | 0 | (2) | (2) | (2) | (2) | — | — | — |
| 1 | 12.5 | 0.25 | 0 | (2) | (2) | (2) | (2) | — | — | 2.7 |
| 1 | 15 | 0.25 | 0 | 5570 | 4550 | 52.6 | 416 | — | — | 2.2 |
| 1 | 20 | 0.25 | 0 | 5410 | 4460 | 49.1 | 422 | — | — | 0 |
| 1 | 30 | 0.25 | 0 | 5360 | 4460 | 50.1 | 423 | 170.1 | 1.89 | 0 |
| 1 | 60 | 0.25 | 0 | 5250 | 4380 | 50.5 | 425 | 173.1 | 1.92 | 0 |
| 1 | 90 | 0.25 | 0 | 5190 | 4350 | 50.0 | 426 | 170.1 | 1.89 | 0 |
| % Change for #1 at 60 minutes vs Baseline 1 | — | — | — | −5.6% | −6.4% | −2.9% | −11 deg F. | +4.1% | +4.1% | −100% |

(2) No data taken do to momentary loss of film bubble for approximately 8 minutes. Extruder RPM was maintained at target setting (90 RPM) for nearly all of this 8 minute period of time.

TABLE 3

Blown Film Extrusion of Baseline 2 (Run #1) Followed by
Comparative Example #2 with 0.08% Dynamar FX-9613 PPA.
(No HALS in either formulation)

| | Extruded Sample | Processing Aid | | 2.5 in. Egan Blown Film Extrusion Conditions | | | | | | |
|---|---|---|---|---|---|---|---|---|---|---|
| Example # | Elapsed Extrusion Time (min) | Bioterge AS-90B Conc (wt %) | Dynamar FX-9613 Conc (wt %) | Head Pressure (psig) | Die Pressure (psig) | Motor Load (amps) | Melt Temp (deg F.) | Extruder Output (lb/hr) | Specific Extruder Output (lb/hr/rpm) | Melt Fracture (%) |
| Baseline 2 (Run #1) | 80 | 0 | 0 | 6020 | 4990 | 59.5 | 450 | 180 | 2.00 | 98.8 |
| C2 | 2 | 0 | 0.08 | 5890 | 4950 | 58.7 | 449 | — | — | 98.7 |
| C2 | 10 | 0 | 0.08 | 5390 | 4510 | 57.1 | 443 | — | — | 4.6 |
| C2 | 12.5 | 0 | 0.08 | 5190 | 4430 | 56.9 | 441 | — | — | 0.2 |
| C2 | 15 | 0 | 0.08 | 5190 | 4360 | 56.9 | 441 | — | — | 0 |
| C2 | 20 | 0 | 0.08 | 5180 | 4300 | 56.3 | 440 | 177.8 | 1.98 | 0 |
| C2 | 30 | 0 | 0.08 | 5130 | 4260 | 55.3 | 438 | 179.0 | 1.99 | 0 |
| C2 | 60 | 0 | 0.08 | 4920 | 4210 | 55.2 | 434 | 180.1 | 2.00 | 0 |
| % Change for #C2 at 60 minutes vs Baseline 2 | — | — | — | −18.3% | −15.6% | −7.2% | −16 deg F. | 0.% | 0.% | −98.8% |

TABLE 4

Blown Film Extrusion of Baseline 2 (Run #2) Followed by
Example #2 with 0.25% Bioterge AS90B Surfactant.
(No HALS in either formulation)

| | Extruded Sample | Processing Aid | | 2.5 in. Egan Blown Film Extrusion Conditions | | | | | | |
|---|---|---|---|---|---|---|---|---|---|---|
| Example # | Elapsed Extrusion Time (min) | Bioterge AS-90B Conc (wt %) | Dynamar FX-9613 Conc (wt %) | Head Pressure (psig) | Die Pressure (psig) | Motor Load (amps) | Melt Temp (deg F.) | Extruder Output (lb/hr) | Specific Extruder Output (lb/hr/rpm) | Melt Fracture (%) |
| Baseline 2 (Run #2) | 70 | 0 | 0 | 6000 | 4990 | 55.8 | 448 | 177.4 | 1.97 | 99.8 |
| 2 | 2 | 0.25 | 0 | 5800 | 4290 | 52.0 | 445 | — | — | 100 |
| 2 | 10 | 0.25 | 0 | 5420 | 4510 | 50.4 | 431 | — | — | 2.5 |
| 2 | 12.5 | 0.25 | 0 | 5130 | 4390 | 49.5 | 430 | — | — | 0 |
| 2 | 15 | 0.25 | 0 | 5150 | 4290 | 49.2 | 427 | 158.3 | 1.76 | 0 |
| 2 | 20 | 0.25 | 0 | 5090 | 4280 | 50.5 | 424 | 155.3 | 1.73 | 0 |

TABLE 4-continued

Blown Film Extrusion of Baseline 2 (Run #2) Followed by
Example #2 with 0.25% Bioterge AS90B Surfactant.
(No HALS in either formulation)

| Extruded Sample | | Processing Aid | | 2.5 in. Egan Blown Film Extrusion Conditions | | | | | | |
|---|---|---|---|---|---|---|---|---|---|---|
| Example # | Elapsed Extrusion Time (min) | Bioterge AS-90B Conc (wt %) | Dynamar FX-9613 Conc (wt %) | Head Pressure (psig) | Die Pressure (psig) | Motor Load (amps) | Melt Temp (deg F.) | Extruder Output (lb/hr) | Specific Extruder Output (lb/hr/rpm) | Melt Fracture (%) |
| 2 | 30 | 0.25 | 0 | 5090 | 4220 | 50.0 | 421 | 160.2 | 1.78 | 0 |
| 2 | 60 | 0.25 | 0 | 4930 | 4100 | 48.5 | 420 | 163.5 | 1.82 | 0 |
| % Change for #2 at 60 minutes vs Baseline 2 | | — | — | −17.8% | −17.8% | −13.1% | −28 deg F. | −7.8% | −7.8% | −99.8% |

Although the present invention has been described in considerable detail with reference to certain preferred embodiments thereof, other versions are possible. For example, while linear polyethylene films containing HALS or other amine additives, and surfactants have been exemplified other articles including molded or other formed polyethylene articles including surfactants and amines are contemplated. Additionally, while certain ingredients have been exemplified, other ingredients, and/or other inclusion levels are also contemplated. Therefore the spirit and scope of the appended claims should not be limited to the description of the preferred versions contained herein.

We Claim:

1. A method for processing an amine containing linear polyethylene into an article comprising:

a) selecting a linear polyethylene from the group of linear low density polyethylene (LLDPE), metallocene-linear low density polyethylene (m-LLDPE), high density polyethylene (HDPE), plastomers, medium density polyethylene (MDPE), ultra-high molecular weight-high density polyethylene (UHMW-HDPE) and combinations thereof;

b) selecting one or more amine stabilizers from a sterically hindered piperidine group structure of the general formula:

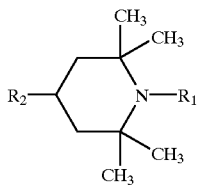

where $R_1$ is one of hydrogen, hydroxyl, straight chain or branched alkyl of 1 to 18 carbons, straight chain or branched alkoxy of 1 to 18 carbons, aryl, arylalkyl of 7 to 18 carbons, cycloalkyl of 5 to 18 carbons, cycloalkoxy of 5 to 18 carbons; the alkyl, alkoxy, aryl, arylalkyl, cycloalkyl or cycloalkoxy groups may optionally contain one or more hydroxyl groups;

$R_2$ is one of aliphatic amine, aliphatic diamine, aromatic amine, straight chain or branched alkyl of 1 to 18 carbons, aliphatic ester, cycloalkyl of 5 to 18 carbons wherein said aliphatic amine, aliphatic diamine, aromatic amine, alkyl, aliphatic ester, or cycloalkyl group is optionally bound to an aliphatic carbon or silicone based chain which may optionally contain one or more triazine groups, the aliphatic carbon or silicone based chain may optionally be polymerizable;

c) selecting a surfactant, said surfactant is a monovalent salt of an alkene sulfonate, hydroxy alkane sulfonate, or mixtures thereof;

d) placing an amount of said surfactant into said polyethylene sufficient to reduce melt fracture and torque; and e) melt processing said polyethylene, said amine and said surfactant to form an article.

2. The method of claim 1 wherein said amine is one or more of bis(2,2,6,6-tetramethyl-4-piperidyl)sebacate, dimethyl succinate polymer with 4-hydroxy-2,2,6,6-tetramethyl-1-piperidineethanol, poly[(6-morpholino-s-triazine-2,4-diyl){2,2,6,6-tetramethyl-4-piperidyl)imino]-hexamethylene[2,2,6,6-tetramethyl-4-piperidyl)imino]], poly[(6-[1,1,3,3-tetramethylbutyl)amino]-s-triazine-2,4-diyl][2,2,6,6-tetramethyl-4-piperidyl)imino]] hexamethylene[2,2,6,6-tetramethyl-4-piperidyl)imino]], 2,2,6,6-tetramethylpiperidin-4-yl acrylate/methyl methacrylate copolymer, 1,3,5-triazine-2,4,6-triamine,N,N'''-[1,2-ethanediylbis[[[4,6-bis[butyl(1,2,2,6,6-pentamethyl-4-piperidinyl)amino]-1,3,5-triazine-2-yl]imino]-3,1propanediyl]]-bis[N',N''-dibutyl-N',N''-bis(1,2,2,6,6-pentamethyl-4-piperidinyl)-, or polymer of 2,2,4,4 tetramethyl-7-oxa-3,20diaza-dispiro[5.1.11.2]-heneicosane-21-on.

3. The method of claim 2 wherein said linear polyethylene is selected from the group consisting of copolymers of ethylene and at least one α-olefin selected from the group consisting of propylene, 1-butene, 1-pentene, 4-methyl-1-pentene, 1-hexene, 1-octene, 1-decene, and combinations thereof.

4. The method of claim 2 wherein said linear polyethylene is an ethylene α-olefin copolymer selected from the group consisting of ethylene propylene, ethylene 1-butene, ethylene 1-pentene, ethylene 4-methyl-1-pentene, ethylene 1-hexene, and ethylene 1-octene;

wherein said linear polyethylene has a density in the range of from 0.86–0.94 g/cc.

5. The method of claim 4 wherein said surfactant is present up to 0.5 wt %, based on the total weight of said polyethylene, amine and said surfactant, wherein said article is a film, and wherein said linear polyethylene has a density from 0.88–0.930 g/cc.

6. The method of claim 4 wherein said surfactant is present up to 0.35 weight percent based on the total.

7. The method of claim 1 wherein said linear polyethylene includes at least a second polymer selected from the group consisting of low density polyethylene (LDPE), ethylene vinyl acetate (EVA), ethylene ethyl acrylate (EEA), ethylene normal butyl acrylate (EnBA), ethylene methacrylic acid (EMAA), ethylene methyl acrylate (EMA), ethylene acrylic acid (EAA) and ionomers of the acids, and combinations thereof.

8. The method of claim 1 wherein said article is a blown film substantially free of melt fracture, said linear polyethylene is selected from the group consisting of ethylene propylene, ethylene 1-butene, ethylene 4-methyl-1-pentene, ethylene 1-pentene, ethylene 1-hexene, and ethylene 1-octene;
  wherein said surfactant is a sodium alkyl sulfonate, wherein said alkyl group is a $C_6$–$C_{30}$ alkyl, wherein said alkyl group is selected from the group consisting of branched or straight chain alkenyl, branched or straight chain hydroxyl substituted alkyl, and combinations thereof, and wherein said surfactant is present in said blown film up to about 0.5 weight percent based on the total weight of said polyethylene, amine and surfactant.

9. The method of claim 8 wherein said surfactant is a sodium α-olefin sulfonate, wherein said α-olefin has 12 to 18 carbon atoms, and said surfactant is present in said blown film up to 0.35 weight percent.

10. A method of improving processability of amine containing linear polyethylenes comprising:
  a) selecting a linear polyethylene from the group consisting of linear low density polyethylene (LLDPE), metallocene-linear low density polyethylene (m-LLDPE), high density polyethylene (HDPE), plastomers, medium density polyethylene (MDPE), ultra-high molecular weight-high density polyethylene (UHMW-HDPE) and combinations thereof.
  b) selecting an amine wherein said amine compound is selected from one or more of the hindered piperidine groups of the general formula:

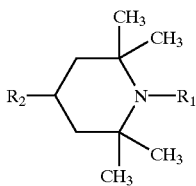

where
    $R_1$ is one of hydrogen, hydroxyl, straight chain or branched alkyl of 1 to 18 carbons, straight chain or branched alkoxy of 1 to 18 carbons, aryl, arylalkyl of 7 to 18 carbons, cycloalkyl of 5 to 18 carbons, cycloalkoxy of 5 to 18 carbons; the alkyl, alkoxy, aryl, arylalkyl, cycloalkyl or cycloalkoxy groups may optionally contain one or more hydroxyl groups,
    $R_2$ is one of aliphatic amine, aliphatic diamine, aromatic amine, straight chain or branched alkyl of 1 to 18 carbons, aliphatic ester, cycloalkyl of 5 to 18 carbons wherein said aliphatic amine, aliphatic diamine, aromatic amine, alkyl, aliphatic ester, or cycloalkyl group is optionally bound to an aliphatic carbon or silicone based chain which may optionally contain one or more triazine groups; said aliphatic carbon or silicone based chain may optionally be polymerizable compound;
  c) selecting a surfactant from a non-halogenated alkali metal alpha-olefin sulfonates wherein said surfactant is present in said linear polyethylene in an amount up to 0.5 weight percent based on the total weight of said linear polyethylene and said surfactant; said amount being sufficient to reduce melt fracture and reduce torque; and
  d) melt processing said linear polyolefin, said amine and said surfactant.

11. A method of improving processability of ultraviolet light stabilized linear polyethylenes comprising:
  a) selecting a linear polyethylene from the group consisting of linear low density polyethylene (LLDPE), metallocene-linear low density polyethylene (m-LLDPE), high density polyethylene (HDPE), plastomers, medium density polyethylene (MDPE), ultra-high molecular weight-high density polyethylene (UHMW-HDPE) and combinations thereof.
  b) selecting a hindered amine light stabilizer (HALS);
  c) selecting a non-halogenated alpha-olefin sulfonic acid alkali metal salt, wherein said metal salt is present in said linear polyethylene in an amount up to 0.5 weight percent based on the total weight of said linear polyethylene; said amount being sufficient to reduce melt fracture and reduce torques; and
  d) melt processing said linear polyolefin said HALS and said salt.

12. An ultraviolet (UV) light stabilized narrow molecular weight distribution polyethylene comprising:
  a) a polyethylene having an $M_w/M_n$ not exceeding 3;
  b) a non-halogenated alkali metal alpha-olefin sulfonate wherein said alpha-olefin is an aliphatic group having 6–30 carbon atoms;
  c) a hindered amine light stabilizer
wherein said sulfonate is present in said polyethylene in an amount in the range of 0.01–0.5 weight percent, based on the total weight of said polyethylene, said amine, and said sulfonate; said amount being sufficient to reduce melt fracture and reduce torque.

13. The polyethylene of claim 12, wherein said polyethylene has a $M_w/M_n$ not exceeding 2.5, said aliphatic group has 8–24 carbon atoms and said sulfonate is present in said polyethylene in the range of 0.03–0.35 weight percent based on the total weight of said polyethylene.

14. The polyethylene of claim 12, wherein said polyethylene has a $M_w/M_n$ not exceeding 2.5, said aliphatic group has 12–18 carbon atoms and said sulfonate is present in said polyethylene in the range of 0.03–0.35 based on the total weight of said polyethylene.

15. A film made from polyethylene of any one of claim 12, 13, or 14.

16. A method of improving melt processing of amine containing linear polyethylene comprising:
  combining a linear polyethylene, an amine, and a surfactant, wherein said surfactant is represented by the general formula:

wherein x=3 or 4
  wherein $M_1$ is selected from the group consisting of: Li, Na, K, and other alkali cations, and
  $R_1$ is selected from the group consisting of:
    branched or straight chain mono and di unsaturated alkenyl,
    branched or straight hydroxyl substituted alkyl, and combinations thereof;

wherein said $R_1$ is non-halogenated; and wherein the carbon number of said $R_1$, ranges from 6 to 30;

wherein said surfactant is present in said combination in an amount in a range of 0.01–0.5 weight percent, based on the total weight of the combinations; said amount being sufficient to reduce melt fracture and reduce torque;

wherein said amine is a hindered amine.

17. A method of improving melt processing of narrow molecular weight distribution polyethylene comprising:

combining,
   a) a polyethylene having a density in the range of 0.860 to 0.970 g/cm³, and a $M_w/M_n$ less than 3;
   at least one surfactant represented by the formulae:

$$[R_1SO_3]M_1$$

wherein $M_1$ is selected from the group consisting of: Li, Na, K, and other cations, and
   $R_1$ is selected from the group consisting of:
     branched or straight chain mono or di unsaturated alkenyl,
     branched or straight chain hydroxyl substituted alkyl,
   wherein $R_1$ is non-halogenated; and
   wherein the carbon number of said $R_1$ ranges from 6 to 30; and
   c) a hindered amine light stabilizer,
   wherein said surfactant is present in said combination in an amount in a range of 0.03–0.35 weight percent; said amount being sufficient to reduce melt fracture and reduce torque.

18. A polyethylene comprising:

a) a polyethylene having a $M_w/M_n$ not exceeding 2.5, a $M_z/M_w$ not exceeding 2;

b) a non-halogenated surfactant selected from the group consisting of alpha-olefin sulfonates of alkali-metals, wherein said alpha-olefin is an aliphatic groups having a carbon number greater than 6; and c) a hindered amine wherein said surfactant is present in said polyethylene in an amount up to about 1 weight percent based on the total weight of the polyethylene, the amine, and the surfactant;. said amount being sufficient to reduce melt fracture and reduce torque.

19. A method of substantially eliminating melt fracture during the processing of amine containing linear polyethylenes comprising:

a) selecting a linear polyethylene from the group consisting of linear low density polyethylene (LLDPE), metallocene-linear low density polyethylene (m-LLDPE), high density polyethylene (HDPE), plastomers, medium density polyethylene (MDPE), ultra-high molecular weight-high density polyethylene (UHMW-HDPE) and combinations thereof;

b) selecting a hindered amine compound;

c) selecting a surfactant from the group consisting of an alkali metal alpha-olefin sulfonate surfactant, said surfactant being non-halogenated, wherein said surfactant is present in said linear polyethylene in an amount up to 0.5 weight percent based on the total weight of said linear polyethylene and said surfactant; said amount being sufficient to reduce melt fracture and reduce torque; and d) melt processing said linear polyolefin said amine and said surfactant.

* * * * *